Aug. 29, 1967 J. A. FORBES 3,339,087
SEMICONDUCTIVE CHOPPER CIRCUIT WITH IMPROVED ERROR SIGNAL COMPENSATION
Filed Sept. 30, 1964
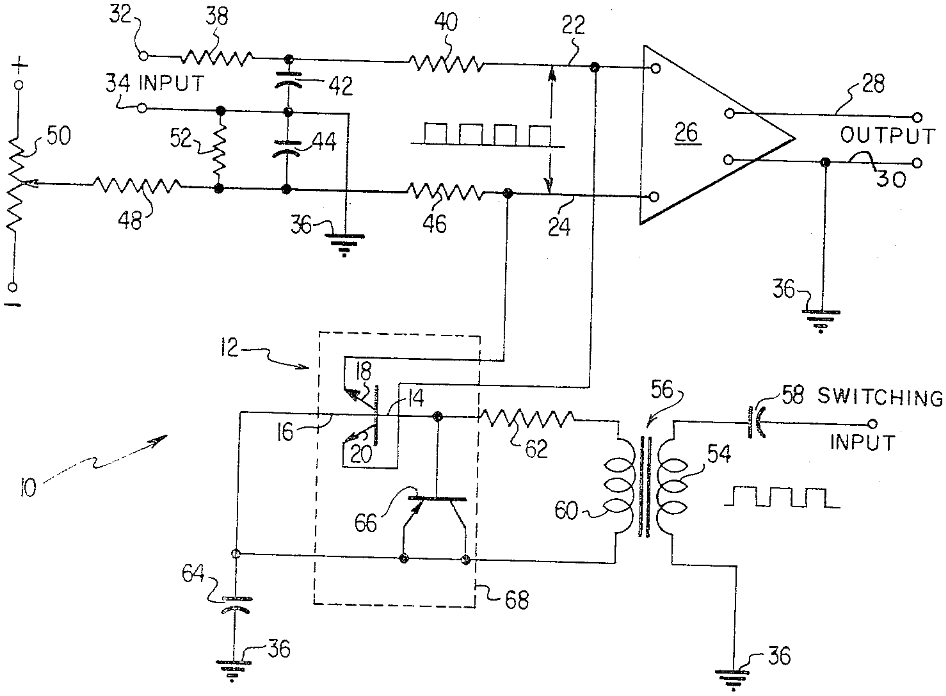
INVENTOR.
JAMES A. FORBES
BY Sughrue, Rothwell, Mion, Zinn & Macpeak
ATTORNEYS.

United States Patent Office 3,339,087
Patented Aug. 29, 1967

3,339,087

SEMICONDUCTIVE CHOPPER CIRCUIT WITH IMPROVED ERROR SIGNAL COMPENSATION

James A. Forbes, Hatboro, Pa., assignor, by mesne assignments, to Robertshaw Controls Company, Richmond, Va., a corporation of Delaware Filed Sept. 30, 1964, Ser. No. 400,520
5 Claims. (Cl. 307—88.5)

ABSTRACT OF THE DISCLOSURE

A chopper circuit utilizing a four terminal, semiconductive device having a base, a collector and two emitters. The emitters connected across a D.C. source and an A.C. switching signal is applied across the base and collector. This makes the emitters alternately appear as an open circuit and a short circuit, which chops the D.C. signal and converts it to A.C. A potentiometer compensates for voltages generated in the device, switching transients are capacitively coupled to ground, excessive reverse biasing is prevented by a transistor clamp, and leakage current is compensated for by matched input resistors and grounding capacitors.

This invention relates in general to a chopper circuit for converting a D.C. input signal into an A.C. output signal, and more particularly to a novel semiconductive chopper circuit which features greatly improved error signal compensation and a correspondingly increased signal-to-noise ratio as compared with the chopper circuits of the prior art.

The use of semiconductive devices, such as standard three-terminal transistors, as on-off type switches for effecting a D.C. to A.C. conversion or derectification is well known in the prior art. The existing circuits, however, suffer from a great many disadvantages stemming from the generation of error signals in the chopper devices and their associated control circuits. These error signals, or second order effects, are generally independent of the magnitude of the D.C. input signal and the prior art choppers are thus characterized by extremely low, and sometimes wholly unacceptable, signal-to-noise ratios when employed in systems where the D.C. input signals are comparatively small in magnitude.

It is, accordingly, a primary object of this invention to provide a novel semiconductive chopper circuit which effectively overcomes the above-noted disadvantages of the prior art chopper circuits and which is characterized by a high signal-to-noise ratio, even when handling input signals of comparatively low magnitude.

It is a further object of this invention to provide such a chopper circuit which features the use of a four-terminal semiconductive device as the switching element.

It is a further object of this invention to provide such a chopper circuit in which means are provided to compensate for and/or minimize the effects of all error signals generated in the chopper device and its associated control circuit.

It is a further object of this invention to provide such a chopper circuit which is particularly, although by no means exclusively, adapted to be used as an on-off or open circuit-short circuit switch between the two input terminals of a differential amplifier in a D.C. amplifier environment, thus effecting the conversion of an applied D.C. input signal into an A.C. signal which is more conveniently capable of amplification.

These and further objects and advantages of this invention will be readily apparent to those skilled in the art from a consideration of the following description of a preferred embodiment of the invention, taken in conjunction with the drawing in which the single figure shows a schematic circuit diagram of the invention employed in conjunction with a differential amplifier.

Referring now to the drawing, the over-all chopper circuit, designated generally by reference numeral 10, includes a four-terminal semiconductive device 12 having a base terminal 14, a collector terminal 16 and a pair of emitter terminals 18 and 20. The emitter terminals are connected across the two input leads 22 and 24 of a differential amplifier 26. This differential amplifier may be of any conventional type, not essential to the present invention. Very briefly, the amplifier 26 produces an output signal across leads 28 and 30 which is proportional to the instantaneous difference between the two input signals applied over leads 22 and 24 and which excludes any extraneous signals, such as common-mode signals, present in both input signals.

A D.C. input signal is applied to the chopper circuit 10 at terminals 32 and 34, the latter being grounded at 36. Terminal 32 is connected to the input lead 22 of the differential amplifier through a pair of series resistors 38 and 40, of which resistor 38 represents part of the impedance of the source of D.C. input signals. A first capacitor 42 is connected between the junction point of resistors 38 and 40 and ground, and a second capacitor 44, equal in value to capacitor 42, is connected between ground and the junction point of resistors 46 and 48. Resistor 46 is equal in value to resistor 40 and is tied to the input lead 24 of the differential amplifier, while resistor 48 is connected to the adjustable tap of a balancing potentiometer 50 connected between the positive and negative terminals of a D.C. voltage source. A resistor 52 is connected in parallel with capacitor 44 between ground and the junction point of resistors 46 and 48.

A source of alternating drive signals for the chopper, which may be a square wave derived from a free-running multivibrator, is coupled to the grounded primary 54 of an isolating transformer 56 through a filter capacitor 58. The output from the secondary 60 of the transformer is connected across the base terminal 14 and the collector terminal 16 of the semiconductive device 12 through a resistor 62, and the collector terminal 16 is also coupled to ground at 36 through an isolating capacitor 64. A PNP limiting transistor 66 has its base connected to the base of the semiconductive device and its emitter and collector connected to the collector of the semiconductive device, and both the transistor 66 and the semiconductive device 12 are enclosed within a closely regulated, constant temperature chamber, generally indicated by the broken line 68.

The operation of the chopper circuit 10 will now be described, from which the purpose and functioning of the various compensating components will become apparent. Essentially, the square wave drive signal coupled through the transformer 56 renders the semiconductive device 12 alternately conductive and non-conductive. When a forward biasing potential is applied between the base and collector terminals the device becomes conductive, in which state the impedance between the two emitter terminals is extremely low and may be generally considered to be a short circuit. On the other hand, when the base-collector terminals are subjected to a reverse biasing potential the device becomes non-conductive, in which condition the impedance between the two emitter terminals is almost infinite and may be thought of as an open circuit. The semiconductive device 12 is thus made to act as an alternate on-off type of switch under the control of the drive signal.

Ideally, when the device 12 is off the path between the two input leads 22 and 24 of the differential amplifier is open circuited and the D.C. voltage level applied to input terminal 32 appears on lead 22. Lead 24 will remain substantially at ground potential. Conversely, when the device 12 is on the leads 22 and 24 are essentially short circuited together and the net voltage across them is zero. In this manner, the differential amplifier 26 alternately sees a voltage difference across its input terminals equal to the applied D.C. input signal, to zero, to the D.C. input, etc., such alternations having a frequency corresponding to that of the drive signal.

Unfortunately, this ideal type of operation is never quite achieved in actual practice because the semiconductive device 12 and its associated control circuitry produce numerous error signals that would, if not otherwise compensated for, impress themselves upon the input leads of the differential amplifier. This invention does, however, provide means to compensate for and/or minimize the effects of such error signals, as developed below, which results in a greatly improved signal-to-noise ratio, even when handling input signals of comparatively low magnitude.

One source of such error signal appears as a voltage source across the semiconductive device when it is switched on, and is attributable to the fact that the device 12 generates a small D.C. voltage even when in the on or short circuited condition, and the magnitude of this voltage will vary from one such device to another. To compensate for this voltage source and in order to establish an amplifier output of zero for a D.C. input signal of zero, the potentiometer 50 is provided. Essentially, the potentiometer 50 is adjusted, with a zero D.C. input signal, until no signal is produced at the output terminals of the amplifier. When this condition is achieved the potentiometer is actually supplying a D.C. voltage through resistors 48 and 46 that is equal in magnitude but opposite in polarity to the error voltage generated within the on semiconductive device, thus effectively cancelling same. This error voltage is also affected by temperature and by variations in the drive signal. To compensate for these additional factors, the device is placed within a constant temperature chamber 68 and the drive signal itself is closely regulated to within very small tolerances.

A further source of error signal appears as a leakage current generated by the semiconductive device when in its off condition, and this current source may be thought of as being in parallel with the emitter terminals of the device 12. When the device is off this current flows through resistors 40 and 38 to the external circuit and returns through resistors 52 and 46, and at the same time causes a charge to be built up on the filter capacitors 42 and 44. Voltage drops of opposite polarity are thus developed across resistors 40 and 46 and these drops appear as error signals at the input terminals of the amplifier. In addition, when the device 12 is switched on during the next half-cycle the energy stored in the capacitor 42 and 44 discharges back through resistor 40, the emitter paths of the device and resistor 46, once more generating opposite polarity voltage drops across the resistors which appear as error signals at the amplifier inputs. If the impedance of the D.C. input source is very low, the charge on the capacitors will be small, but if such impedance is comparatively high the capacitors will be heavily charged and the error voltage drops caused by their discharge during the on half-cycle will be correspondingly large. In accordance with this invention, the effects of these voltage drops during both half-cycles are minimized by employing very stable, low ohmic valued resistors for resistors 40 and 46, thus providing for predictable error voltage drops across the resistors of a relatively low magnitude.

An additional source of chopper error signal stems from switching transients developed in the semiconductive device 12 that are, once again, temperature sensitive and drive signal sensitive. One of these transients is attributable to the inter-electrode capacitance inherently present between the base of the semiconductive device and each of the emitters. In essence, these capacitances are charged during the off half-cycles of the device and discharge through the emitter-base diodes during the on half-cycles, thus delivering spike wave forms to the amplifier input leads 22 and 24 that are basically differentiations of the square wave drive signal pulses.

If these two spike signal transients can be made to have identical wave forms in both amplitude and phase, then the net difference between them will always be zero and they will be rejected as common-mode signals by the differential amplifier 26. In order to insure that their wave forms are always equal this invention provides that the semiconductive device 12 have matched emitter-base capacitance values and that the impedances from each input terminal of the amplifier to ground are equal. The matching of the capacitance values may be achieved by selecting a semiconductive device that is purposely designed and manufactured to be possessant of this quality, while the equality of the ground impedance paths is implemented by employing matched pairs of resistors 40 and 46 and capacitors 42 and 44.

A further source of transient error signals results from the leakage of the drive signal itself through the semiconductive device 12. One way of preventing currents from this source from being passed to ground through the emitter-base diodes of the device would be to ground the collector terminal 16 of the chopper. If the collector is directly grounded, however, then the relatively large voltage associated with each emitter-collector junction of the on device is allowed to flow into the filter capacitors 42 and 44, thus generating a further error signal. To avoid the first problem without creating the second, this invention provides for the grounding of the collector terminal 16 of the semiconductive device through a third filter or isolating capacitor 64. With such an arrangement switching transients flowing in the interwinding capacitances of the transformer 56 are passed to ground through capacitor 64. At the same time, however, the capacitor 64 isolates the collector terminal of the semiconductive device from ground with respect to D.C. signals, and thus the emitter-collector voltages of the chopper are held at their average values and prevented from flowing into the filter capacitors 42 and 44. Although the A.C. components of these voltages are not blocked by the capacitor 64 and do in fact travel to ground through the resistors 40 and 46 and the capacitors 42 and 44, the voltage drops created thereby across the resistors 40 and 46 are of the same polarity with respect to the input terminals of the amplifier and substantially equal in magnitude, and their net effect is thus negligible.

A further source of error signal might arise from the excessive reverse biasing of the device 12 by the drive signal, and to prevent this from happening the transistor 66 has been provided. When the base-emitter potential of this transistor exceeds a small negative value, in the order of —0.15 volt, the transistor becomes conductive and effectively clamps the base-collector potential of the device 12 at this level.

In one practical embodiment of the above-described chopper circuit, which is presented by way of example only, the following component values were employed:

| | | |
|---|---|---|
| Semiconductive device 12 | | Sperry semiconductor type PT-715. |
| R38, 40, 46 | ohms | 220 |
| R52 | do | 410 |
| C42, 44 | microfarads | 330 |
| R48 | ohms | 200K |
| R50 | do | 1K |
| C64 | microfarad | .5 |

The unlisted components were of a more standard functional nature and their values are not particularly critical. With such component values tests have indicated that the circuit possesses a stability of better than one microvolt overt the extreme expected ranges of line voltage, ambient temperature and time.

While the invention has been described in connection with a specific embodiment thereof, it will be understood that it is not to be limited thereto as many minor changes and variations will be readily apparent to those skilled in the art, and the invention is to be accorded the broadest interpretation within the scope of the following claims.

What is claimed is:

1. A chopper circuit comprising:

(a) a four-terminal semiconductive device having a base terminal, a collector terminal and two emitter terminals, (b) a source of alternating drive signals connected across the base terminal and the collector terminal, (c) first and second resistors of equal value individually connected in series with the emitter terminals, (d) first and second capacitors of equal value individually connected between the first and second resistors, respectively, and ground, (e) means connecting a source of D.C. input signals between the junction of the first resistor and the first capacitor and ground, the value of the first and second resistors being relatively low as compared with the resistance of the source of D.C. input signals, (f) means connected to the two emitter terminals for extracting an A.C. output signal therefrom, (g) a potentiometer connected across a source of D.C. potential, (h) means connecting the output from the potentiometer to the junction of the second resistor and the second capacitor, (i) a third capacitor connected between the collector terminal and ground, and (j) a limiting transistor having its base terminal connected to the base terminal of the semiconductive device and its emitter and collector terminals connected to the collector terminal of the semiconductive device.

2. A chopper circuit comprising:

(a) a four-terminal semiconductive device having a base terminal, a collector terminal and two emitter terminals, (b) a source of alternating drive signals connected across the base terminal and the collector terminal, (c) input signal coupling means for connecting a source of D.C. input signals across the two emitter terminals, (d) means connected to the two emitter terminals for extracting an A.C. output signal therefrom, whereby the drive signals render the semiconductive device alternately conductive and non-conductive to thereby convert the D.C. input signal into an A.C. output signal, and (e) a potentiometer connected across a source of D.C. potential and means connecting the output from the potentiometer to the input signal coupling means, whereby the potentiometer output may be adjusted to balance out error signal voltages generated in the semiconductive device.

3. A chopper circuit comprising:

(a) a four-terminal semiconductive device having a base terminal, a collector terminal and two emitter terminals, (b) a source of alternating drive signals connected across the base terminal and the collector terminal, (c) input signal coupling means for connecting a source of D.C. input signals across the two emitter terminals, (d) means connected to the two emitter terminals for extracting an A.C. output signal therefrom, whereby the drive signals render the semiconductive device alternately conductive and non-conductive to thereby convert the D.C. input signal into an A.C. output signal, and (e) a capacitor connected between the collector terminal of the semiconductive device and ground, whereby switching transients developed in the circuit are by-passed to ground without affecting the potentials between the emitter and collector terminals of the semiconductive device.

4. A chopper circuit comprising:

(a) a four-terminal semiconductive device having a base terminal, a collector terminal and two emitter terminals, (b) a source of alternating drive signals connected across the base terminal and the collector terminal, (c) input signal coupling means for connecting a source of D.C. input signals across the two emitter terminals, (d) means connected to the two emitter terminals for extracting an A.C. output signal therefrom, whereby the drive signals render the semiconductive device alternately conductive and non-conductive to thereby convert the D.C. input signal into an A.C. input signal, and (e) a limiting transistor having its base terminal connected to the base terminal of the semiconductive device and its emitter and collector terminals connected to the collector terminal of the semiconductive device.

5. A chopper circuit comprising:

(a) a four-terminal semiconductive device having a base terminal, a collector terminal and two emitter terminals, (b) a source of alternating drive signals connected across the base terminal and the collector terminal, (c) input signal coupling means for connecting a source of D.C. input signals across the two emitter terminals comprising:

(1) first and second resistors of equal value individually connected in series with the emitter terminals of the semiconductive device, (2) first and second capacitors of equal value individually connected between the first and second resistors, respectively, and ground, and (3) means connecting a source of D.C. input signals between the junction of the first resistor and the first capacitor and ground, the value of the first and second resistors being relatively low as compared with the resistance of the source of D.C. input signals, and (d) means connected to the two emitter terminals for extracting an A.C. output signal therefrom, whereby the drive signals render the semiconductive device alternately conductive and non-conductive to thereby convert the D.C. input signal into an A.C. output signal.

References Cited

UNITED STATES PATENTS

| | | | |
|---|---|---|---|
| 3,089,041 | 5/1963 | Boensel | 307—88.5 |
| 3,169,222 | 2/1965 | Krugman et al. | 307—88.5 X |
| 3,189,758 | 6/1965 | Bell | 307—88.5 |

ARTHUR GAUSS, *Primary Examiner.*

DAVID J. GALVIN, *Examiner.*

J. HEYMAN, *Assistant Examiner.*